United States Patent
Bhat et al.

(10) Patent No.: US 9,819,505 B2
(45) Date of Patent: Nov. 14, 2017

(54) GROUP BUNDLING PRIORITY DISSEMINATION THROUGH LINK-STATE ROUTING PROTOCOL IN A NETWORK ENVIRONMENT

(71) Applicant: CISCO TECHNOLOGY, INC., San Jose, CA (US)

(72) Inventors: Arvind Bhaskar Bhat, San Jose, CA (US); Naveen Gowda, Bangalore (IN); Ramkumar Sankar, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 136 days.

(21) Appl. No.: 13/970,976

(22) Filed: Aug. 20, 2013

(65) Prior Publication Data

US 2015/0055650 A1    Feb. 26, 2015

(51) Int. Cl.
| | |
|---|---|
| *H04L 12/18* | (2006.01) |
| *H04L 12/715* | (2013.01) |
| *H04L 12/721* | (2013.01) |
| *H04L 12/775* | (2013.01) |
| *H04L 12/751* | (2013.01) |

(52) U.S. Cl.
CPC .......... *H04L 12/185* (2013.01); *H04L 45/58* (2013.01); *H04L 12/18* (2013.01); *H04L 45/02* (2013.01); *H04L 45/46* (2013.01)

(58) Field of Classification Search
None
See application file for complete search history.

(56) References Cited

U.S. PATENT DOCUMENTS

| | | | |
|---|---|---|---|
| 7,209,435 B1* | 4/2007 | Kuo et al. ...................... 370/219 |
| 7,227,872 B1* | 6/2007 | Biswas ............. H04L 29/12367 |
| | | | 370/465 |
| 7,486,610 B1* | 2/2009 | Bhupalam ........... H04L 12/4641 |
| | | | 370/216 |
| 8,166,187 B2 | 4/2012 | Gowda et al. |
| 8,259,720 B2 | 9/2012 | Farinacci et al. |
| 2006/0092976 A1* | 5/2006 | Lakshman .............. H04L 45/04 |
| | | | 370/469 |

(Continued)

OTHER PUBLICATIONS

Wikipedia, the free encyclopedia, "Anycast," [retrieved and printed Aug. 18, 2013], 6 pages; http://en.wikipedia.org/w/index.php?title=Anycast&oldid=562576827.

(Continued)

*Primary Examiner* — Huy D Vu
*Assistant Examiner* — Hong Shao
(74) *Attorney, Agent, or Firm* — Polsinelli PC

(57) ABSTRACT

A method is provided in one example and includes assigning a virtual switch identifier to a group of a plurality of switches in which each of the plurality of switches is configured with a redundancy protocol. The method further includes configuring a redundancy protocol priority value for each the plurality of switches, and generating at least one link-state routing protocol message including priority information indicative of the redundancy protocol priority value associated with one or more of the plurality of switches. The method further includes distributing the at least one link-state routing protocol message to one or more of the plurality of switches.

15 Claims, 7 Drawing Sheets

(56) References Cited

U.S. PATENT DOCUMENTS

2008/0062947 A1* 3/2008 Retana ............... H04L 45/026
                                                        370/342
2008/0089247 A1   4/2008 Sane et al.
2008/0186968 A1*  8/2008 Farinacci et al. ............ 370/392
2008/0225699 A1*  9/2008 Lee ............................ 370/218

OTHER PUBLICATIONS

Wikipedia, the free encyclopedia, "Hot Standby Router Protocol," [retrieved and printed Aug. 18, 2013], 4 pages; http://en.wikipedia.org/wiki/Hot_Standby$_{13}$ Router_Protocol.

Wikipedia, the free encyclopedia, "IS-IS," [retrieved and printed Aug. 18, 2013], 1 page; http://en.wikipedia.org/wiki/IS-IS.

David Oran, "OSI IS-IS Intra-domain Routing Protocol," Network Working Group, RFC 1142, Feb. 1990, 157 pages; http://tools.ietf.org/html/rfc1142.

Ross W. Callon, "Use of OSI-IS for Routing in TCP/IP and Dual Environments," Network Working Group, RFC 1195, Oct. 1990, 68 pages; http://www.ietf.org/rfc/rfc1195.txt.

T. Li, et al., "Cisco Hot Standby Router Protocol (HSRP)," Network Working Group, RFC 2281, Mar. 1998, 17 pages; http://tools.ietf.org/html/rfc2281.

Wikipedia, the free encyclopedia, "Switch virtual interface," last modified May 29, 2013, 1 page; http://en.wikipedia.org/w/index.php?title=Switch_virtual_interface&oldid=557362317.

Juniper Networks, "Understanding Routed LVAN Interfaces on EX Series Switches," published Feb. 8, 2011, 1 page; https://www.juniper.net/techpubs/en.US/junos11.1/topics/concept/bridging-routed-vlan-interface.html.

* cited by examiner

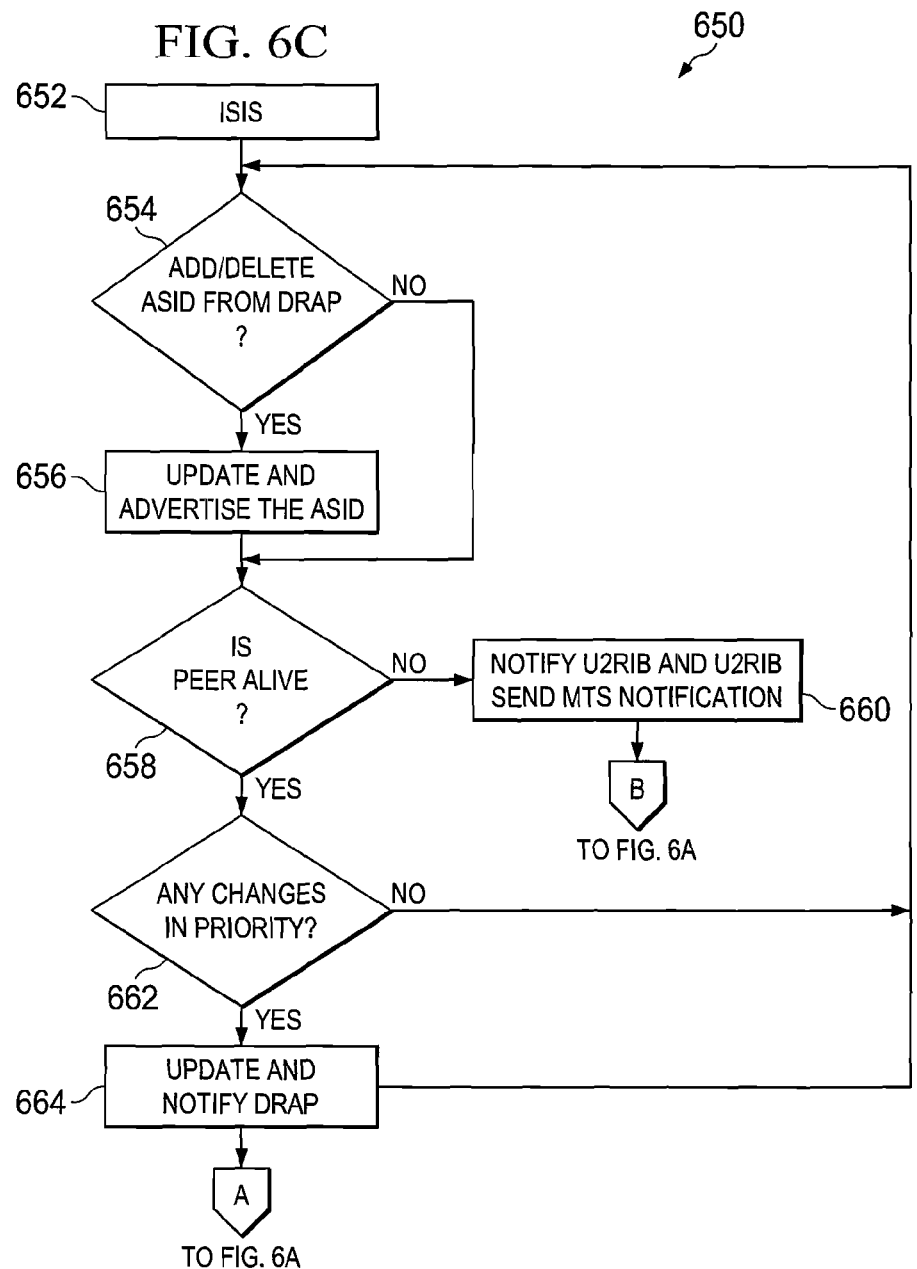

GROUP BUNDLING PRIORITY DISSEMINATION THROUGH LINK-STATE ROUTING PROTOCOL IN A NETWORK ENVIRONMENT

TECHNICAL FIELD

This disclosure relates in general to the field of communications and, more particularly, to providing group bundling priority dissemination through a link-state routing protocol in a network environment.

BACKGROUND

Traditionally, data centers using classical Ethernet switches have implemented Hot Standby Router Protocol (HSRP) to achieve fault tolerance. As discussed, HSRP typically operates in a two-node Active/Standby pair in which the node operating in the active state forwards the Layer 3 traffic upstream, and the peer node operating in standby purely provides redundancy. HSRP on virtual PortChannel (vPC) allows HSRP forwarding to be active on both nodes to fully utilize the dual connectivity to access. VPC+ extends this functionality to a two-node FabricPath spine using an emulated switch ID. As the number of nodes in a FabricPath network grows, there is a desire to utilize all the links connecting Layer 3 spines and make use of full bisectional bandwidth of the FabricPath network. In Anycast HSRP, all of the HSRP spine switches can forward Layer 3 traffic thereby allowing both fault tolerance and high bandwidth utilization. Traditionally, priority information associated with switching nodes of Anycast HSRP are transmitted using Hello messages, which may be bandwidth intensive in certain configurations.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 6A-6C are simplified flowcharts illustrating example operations of the switch of FIG. 2 according to one embodiment.

DETAILED DESCRIPTION OF EXAMPLE EMBODIMENTS

Overview

A method is provided in one example and includes assigning a virtual switch identifier to a group of a plurality of switches in which each of the plurality of switches is configured with a redundancy protocol. The method further includes configuring a redundancy protocol priority value for each the plurality of switches, and generating at least one link-state routing protocol message including priority information indicative of the redundancy protocol priority value associated with one or more of the plurality of switches. The method further includes distributing the at least one link-state routing protocol message to one or more of the plurality of switches.

In more particular embodiments, the method further includes receiving, at a first switch of the plurality of switches having a first redundancy priority value associated therewith, at least one of the link-state routing protocol messages including priority information indicative of at least one other redundancy priority value associated with at least one other switch of the plurality of switches. In other particular embodiments, the method further includes determining the at least one other redundancy protocol priority value associated with the at least one other switch from the received at least one link-state routing protocol message.

In more particular embodiments, the method further includes determining a redundancy state of the first switch based upon the first redundancy priority value associated with the first switch and at least one other redundancy protocol priority value associated with the at least one other switch. In still other particular embodiments, the method further includes determining that the redundancy state of the first switch is an active state if the first redundancy protocol priority value indicates is greater than each of the at least one other redundancy protocol priority values. In still other particular embodiments, the method further includes determining that the redundancy state of the first switch is in a standby state if the first redundancy protocol priority value is the next highest priority value among the at least one other redundancy protocol priority values.

In particular embodiments, the virtual switch identifier is an Anycast Switch identifier (ASID). In still other particular embodiments, the redundancy protocol is a Hot Standby Router Protocol (HSRP). In still other particular embodiments, the link-state routing protocol is an Intermediate System-To-Intermediate System (IS-IS) protocol.

Example Embodiments

Figure 1:
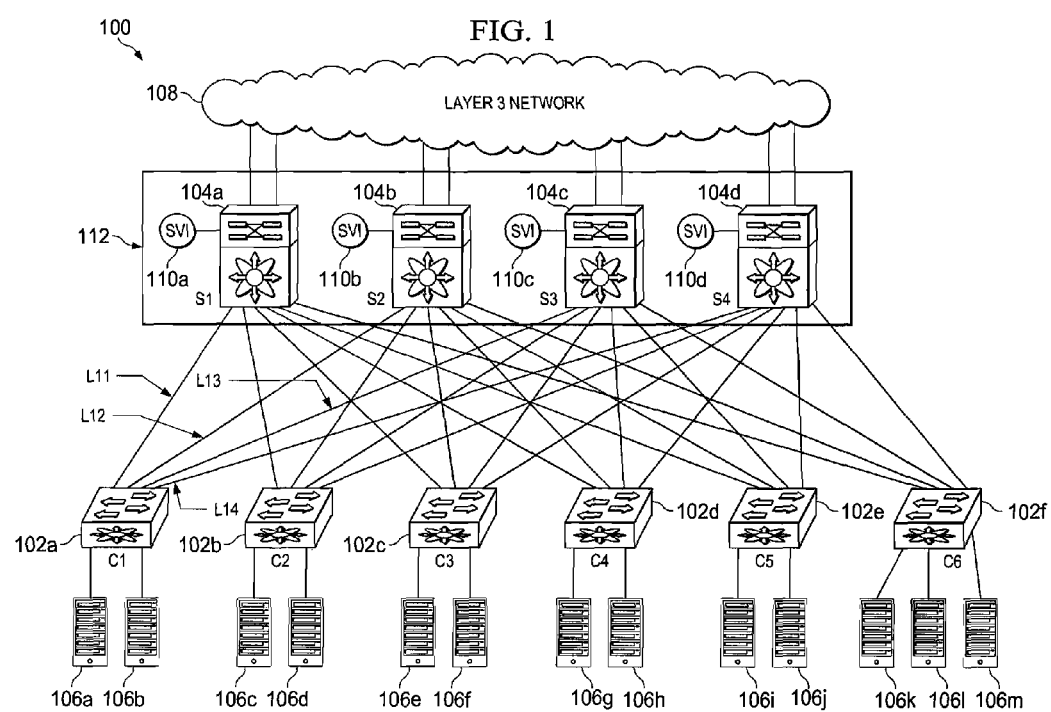
FIG. 1 is a simplified block diagram of an embodiment of a communication system for providing group bundling priority dissemination through a link-state routing protocol in a network environment.

Referring to FIG. 1, FIG. 1 is a simplified block diagram of an embodiment of a communication system 100 for providing group bundling priority dissemination through a link-state routing protocol in a network environment. The communication system 100 of FIG. 1 includes a number of classical Ethernet switches including a first classical Ethernet (CE) switch (C1) 102a, a second classical Ethernet (CE) switch (C2) 102b, a third classical Ethernet (CE) switch (C3) 102c, a forth classical Ethernet (CE) switch (C4) 102d, a fifth classical Ethernet (CE) switch (C5) 102e, and a sixth classical Ethernet (CE) switch (C6) 102f. In the particular embodiment illustrated in FIG. 1, classical Ethernet switches 102a-102f support a traditional Spanning Tree Protocol (STP). Communication system 100 further includes a number of redundancy protocol enabled switches including a first switch (S1) 104a, a second switch (S2) 104b, a third switch (S3) 104c, and a fourth switch (S4) 104d. In a particular embodiment, first switch (S1) 104a, second switch (S2) 104b, third switch (S3) 104c, and fourth switch (S4) 104d are enabled with Hot Standby Router Protocol (HSRP) as a redundancy protocol. In one or more embodiments, first switch (S1) 104a, second switch (S2) 104b, third switch (S3) 104c, and fourth switch (S4) 104d are further enabled with a link-state protocol, such as FabricPath or Transparent Interconnect of Lots of Links (TRILL).

First CE switch 102a, second CE switch 102b, third CE switch 102c, fourth CE switch 102d, fifth CE switch 102e, and sixth CE switch 102f are each in communication with first switch (S1) 104a, second switch (S2) 104b, third switch (S3) 104c, and fourth switch (S4) 104d via link-state protocol links. For example, in the particular embodiment illustrated in FIG. 1, first CE switch 102a (C1) has a first link-state protocol link (L11) with first switch (S1) 104, a second link-state protocol link (L12) with second switch (S2) 104b, a third link-state protocol link (L13) with third switch (S3) 104c, and a fourth link-state protocol link (L14) with fourth switch (S4) 104d. In a particular embodiment, the link-state protocol links are FabricPath links. In a FabricPath topology, CE switches 102a-102f may be referred to a leaf switches, and switches 104a-104 may be referred to as spine switches.

Communication system 100 further includes a end nodes in the form of first host device 106a, a second host device 106b, a third host device 106c, a fourth host device 106d, a fifth host device 106e, a sixth host device 106f, a seventh host device 106g, an eight host device 106h, a ninth host device 106i, a tenth host device 106j, and eleventh host device 106k, a twelfth host device 106l, and a thirteenth host device 106m. In one or more embodiments, one or more of host devices 106a-106m are host servers. First host device 106a and second host device 106b are each in communication with first CE switch 102a via a classical Ethernet link. Third host device 106c and fourth host device 106d are each in communication with second CE switch 102b via a classical Ethernet link. Fifth host device 106e and sixth host device 106f are each in communication with third CE switch 102c via a classical Ethernet link. Seventh host device 106g and eighth host device 106h are each in communication with fourth CE switch 102d via a classical Ethernet link. Ninth host device 106i and tenth host device 106j are each in communication with fifth CE switch 102e via a classical Ethernet link. Eleventh host device 106k, twelfth host device 106l, and thirteenth host device 106m are each in communication with sixth CE device 102f.

One or more of host devices 106a-106m may be associated with providers, clients, customers, or end users wishing to initiate or facilitate a communication in communication system 100 via some network. The term 'host device' is inclusive of devices used to initiate a communication, such as a server, a receiver, a computer, a set-top box, an IRD, or any other device, component, element, or object capable of initiating or facilitating voice, audio, video, media, or data exchanges within communication system 100. One or more of host devices 106a-106m may also be any device that seeks to initiate or facilitate a communication on behalf of another entity or element, such as a program, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another.

Each of first switch (S1) 104a, second switch (S2) 104b, third switch (S3) 104c, and fourth switch (S4) 104d are each in communication with a Layer 3 (network layer) network 108 via Layer 3 links. In a particular embodiment, the Layer 3 network 108 is the Internet. Each of switches 104a-104d is configured with a respective switch virtual interface (SVI) 110a-110d. A switch virtual interface (SVI) is a VLAN of switch ports represented by one interface to a routing or bridging system. There is no physical interface for the VLAN and the SVI provides the Layer 3 processing for packets from all switch ports associated with the VLAN. Switches 104a-104d form a gateway group 112 to layer 3 network 108. In accordance with a redundancy protocol, such as HSRP, one of first switch (S1) 104a, second switch (S2) 104b, third switch (S3) 104c, and fourth switch (S4) 104d is in an active state and one or more of the remaining switches are in a standby state until failure of the active switch occurs in which case one of the remaining switches will assume the role of the active switch.

In one particular instance, communication system 100 can be associated with a service provider digital subscriber line (DSL) deployment. In other examples, communication system 100 would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures. Communication system 100 may include a configuration capable of transmission control protocol/internet protocol (TCP/IP) communications for the transmission and/or reception of packets in a network. Communication system 100 may also operate in conjunction with a user datagram protocol/IP (UDP/IP) or any other suitable protocol, where appropriate and based on particular needs.

CE switches 102a-102f and switches 104a-104d are network elements that facilitate flows between hosts and/or sources in a given network (e.g., for networks such as those illustrated in FIG. 1). As used herein in this Specification, the term 'network element' is meant to encompass routers, switches, gateways, bridges, loadbalancers, firewalls, inline service nodes, proxies, servers, processors, modules, or any other suitable device, component, element, proprietary appliance, or object operable to exchange information in a network environment. This network element may include any suitable hardware, software, components, modules, interfaces, or objects that facilitate the operations thereof. This may be inclusive of appropriate algorithms and communication protocols that allow for the effective exchange of data or information.

In one implementation, switches 104a-104d may include software to achieve (or to foster) the group bundling priority dissemination through link-state routing protocol, as outlined herein in this Specification. Note that in one example, each of these elements can have an internal structure (e.g., a processor, a memory element, etc.) to facilitate some of the operations described herein. In other embodiments, group bundling priority dissemination through link-state routing protocol operations may be executed externally to these elements, or included in some other network element to achieve this intended functionality. Alternatively, switches 104a-104d may include this software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

For purposes of illustrating certain example techniques of communication system 100, it is important to understand the communications that may be traversing the network. The following foundational information may be viewed as a basis from which the present disclosure may be properly explained.

Spanning Tree Protocol (STP) is a network protocol that attempts to ensure a loop-free topology for a bridged Ethernet local area network by preventing bridge loops. Spanning tree protocol allows a network design to include redundant links to provide automatic backup paths if an active link fails, without the danger of bridge loops, or the need for manual enabling/disabling of these backup links. Spanning Tree Protocol (STP), standardized as IEEE 802.1D, creates a spanning tree within a mesh network of connected layer-2 bridges (typically Ethernet switches), and disables those links that are not part of the spanning tree, leaving a single active path between any two network nodes. However, spanning tree protocol is limited in that it requires the use of only one link of a tree for forwarding traffic in order to prevent loops while another link is wasted.

Link-state routing protocols such as Transparent Interconnect of Lots of Links (TRILL) and FabricPath have been developed to overcome the shortcomings of STP. Essentially TRILL and Fabricpath are two link-state routing protocol technologies that were developed to replace Spanning Tree Protocol (STP) in the Ethernet space. TRILL and Fabricpath technologies allow for the use of all possible links in a topology. Fabricpath was developed by Cisco and TRILL is an IETF standard. Both Fabricpath and TRILL use Intermediate System-To-Intermediate System (IS-IS) as the routing protocol used to create a loop free topology as well as to create multiple paths. IS-IS is a link-state routing protocol designed to move information efficiently within a computer network, a group of physically connected computers or similar devices. It accomplishes this by determining the best route for datagrams through a packet-switched network. The IS-IS protocol was defined in ISO/IEC 10589:2002 as an international standard within the Open Systems Interconnection (OSI) reference design. Though originally an ISO standard, the IETF republished the protocol as an Internet Standard in RFC 1142. IS-IS operates by reliably flooding link state information throughout a network of routers or switches. Each IS-IS router or switch independently builds a database of the network's topology and aggregates the flooded network information. IS-IS uses Dijkstra's algorithm for computing the best path through the network. Packets or datagrams are then forwarded through the network to the destination based on the computed ideal path.

Regarding the TRILL protocol, TRILL switches run a link state protocol amongst themselves. In a link state protocol, connectivity is broadcast to all the TRILL switches, so that each TRILL switch knows about all the other TRILL switches, and the connectivity between them. This gives the TRILL switches enough information to compute pair-wise optimal paths for unicast traffic, and calculate distribution trees for delivery of frames either to destinations whose location is unknown or to multicast/broadcast groups. TRILL uses IS-IS link state routing protocol because it runs directly over Layer 2, so it can be run without configuration, i.e., no IP addresses need to be assigned, and it is easy to extend by defining new TLV (type-length-value) data elements and sub-elements for carrying TRILL information. To mitigate temporary loop issues, TRILL switches forward based on a header with a hop count. TRILL switches also specify the next hop TRILL switch as the frame destination when forwarding unicast frames across a shared-media link. This avoids the spawning of additional copies of frames during a temporary loop. A Reverse Path Forwarding check and other checks are performed on multi-destination frames to further control potentially looping traffic.

In a typical use of TRILL, the first TRILL switch that a unicast frame encounters in encapsulates the received frame with a TRILL header that specifies the last TRILL switch where the frame is decapsulated. The first TRILL switch is known as the "ingress RBridge" and the second TRILL switch is known as the "egress RBridge." To save room in the TRILL header and simplify forwarding lookups, a dynamic nickname acquisition protocol is run among the TRILL switches to select two-octet nicknames for the TRILL switches which are unique within the network, and which are an abbreviation for the six-octet IS-IS system ID of the TRILL switch. The two-octet nicknames are used to specify the ingress and egress RBridges in the TRILL header. The TRILL header consists of six octets. The first two octets include a 6-bit decrementing hop count, plus flags, the next two octets contain the egress RBridge nickname, and the final two octets contain the ingress RBridge nickname. For multi-destination frames, the "egress RBridge nickname" specifies a distribution tree for the frame, where the nicknamed TRILL switch is the root of the distribution tree. The ingress RBridge selects which distribution tree the frame should travel along.

Even though TRILL switches are transparent to layer 3 devices, and all the links interconnected by TRILL switches appear to layer 3 devices to be a single link, TRILL switches act as link routers in the sense that, in the forwarding of a frame by a transit TRILL switch, the outer layer 2 header is replaced at each hop with an appropriate layer 2 header for the next hop, and the hop count is decreased. Despite these modifications of the outer layer 2 header and the hop count in the TRILL Header, the original encapsulated frame is preserved, including the original frame's virtual LAN (VLAN) tag. Multipathing of multi-destination frames through alternative distribution tree roots and ECMP (Equal Cost MultiPath) of unicast frames are supported. Networks with a more mesh-like structure will benefit to a greater extent from the multipathing and optimal paths provided by TRILL than will networks with a more tree-like structure.

Similarly, Fabricpath is a link-state routing protocol developed by Cisco that uses the IS-IS routine protocol to implement Shortest Path First (SPF) routing to determine reachability and path selection in a network cloud. Fabricpath uses the IS-IS routing protocol with Fabricpath-specific extensions such as exchanging switch ID (SID) reachability instead of IP prefixes. Fabricpath may also employ equal-cost multipath (ECMP) forwarding to make use of all available bandwidth. Fabricpath-enabled switches differ from classical Ethernet switches in at least two ways: they compute layer 2 paths using control messages carried over IS-IS, the routing protocol, and they encapsulate incoming Ethernet frames with a Fabricpath header. This header contains routable source and destination switch addresses and a time-to-live field for loop prevention. In contrast to STP, Fabricpath creates a single switch fabric across all participating switches, increasing available bandwidth within a single layer-2 domain. Fabricpath also reduces broadcast flooding and media access control (MAC) address table size, both well-known issues with large layer-2 networks. Fabricpath switches use multicast rather than flooding to forward frames sent to unknown destinations, and compute routing tables with information learned from the fabric and source MAC addresses learned on each edge switch. Moreover, using an approach called "conversational learning," switches populate MAC address tables only for ports actually involved in conversations. This differs from conventional switching, where switches see all flooded traffic within a broadcast domain and put every address into their MAC tables. In contrast, Fabricpath switches do not need large MAC address tables, even when layer-2 domains encompass tens of thousands of hosts.

A virtual PortChannel (vPC) allows links that are physically connected to two different switches to appear as a single PortChannel to a third device. This provides a loop free topology eliminating the spanning-tree-blocked ports and maximizing the bandwidth usage. In a FabricPath network, a classical (not FabricPath-enabled) Ethernet switch can be connected through a port channel to two FabricPath edge switches by using a configuration construct called emulated switch. The emulated switch implementations in FabricPath, where two FabricPath edge switches provide a vPC to a third-party device, is called vPC+. vPC+ carries the vPC legacy into the Fabricpath world by offering a migration solution for users or customers who desire to migrate from Classical Ethernet to TRILL or Fabricpath.

Emulated switch is a construct in which two FabricPath switches emulate a single switch to the rest of the FabricPath network. The packets originated by the two emulated switches are sourced with the emulated switch ID. The other FabricPath switches are not aware of this and simply see the emulated switch, identified by a dedicated switch ID value called the emulated switch ID, as reachable through both switches. This means that the two emulated switches have to be directly connected via peer link, and there should be a peer-keep alive path between the two switches to form the vPC+.

The Hot Standby Router Protocol (HSRP) provides a mechanism, which is designed to support non-disruptive failover of IP traffic in certain circumstances. In particular, the protocol protects against the failure of the first hop router when the source host cannot learn the IP address of the first hop router dynamically. The protocol is designed for use over multi-access, multicast, or broadcast capable LANs (e.g., Ethernet). Using HSRP, a set of routers work in concert to present the illusion of a single virtual router to the hosts on the LAN. This set is known as an HSRP group or a standby group. A single router elected from the group is responsible for forwarding the packets that hosts send to the virtual router. This router is known as the active router. Another router is elected as the standby router. In the event that the active router fails, the standby assumes the packet forwarding duties of the active router. Although an arbitrary number of routers may run HSRP, only the active router forwards the packets sent to the virtual router. To minimize network traffic, only the active and the standby routers send periodic HSRP messages once the protocol has completed the election process. If the active router fails, the standby router takes over as the active router. If the standby router fails or becomes the active router, another router is elected as the standby router.

On a particular LAN, multiple hot standby groups may coexist and overlap. Each standby group emulates a single virtual router. For each standby group, a single well-known MAC address may be allocated to the group, as well as an IP address. The IP address should belong to the primary subnet in use on the LAN, but should differ from the addresses allocated as interface addresses on all routers and hosts on the LAN, including virtual IP addresses assigned to other HSRP groups. If multiple groups are used on a single LAN, load splitting can be achieved by distributing hosts among different standby groups.

Typically, when HSRP is running within the HSRP group, each router of the HSRP group may be in an active, standby, or a listen state. In the active state, router is currently forwarding packets that are sent to the group's virtual MAC (VMAC) and the router sends periodic Hello messages to the other routers in the group messages. Excluding transient conditions, there should be at most one router in Active state in the group. In the standby state, the router is a candidate to become the next active router and sends periodic Hello messages. Excluding transient conditions, there should be at most one router in the group in the standby state. In the listen state, the router knows the virtual IP address, but is neither the active router nor the standby router. A router in the listen state listens for Hello messages from the router in the active state and the router in the standby state. Each router maintains three timers, an Active timer, a Standby timer, and a Hello timer. The Active timer is used to monitor the active router, and is started anytime an authenticated Hello message is seen from the active router. The Active timer is set to expire in a Hold time indicated in the Hello message. The Standby timer is used to monitor the standby router and is started anytime an authenticated Hello message is seen from the standby router. The Standby timer is set to expire in the Hold time indicated in the Hello message. The Hello timer expires once per a Hello time period. If the router is in standby or active states, the router should generate a Hello message upon Hello timer expiry.

Anycast is a network addressing and routing methodology in which datagrams from a single sender are routed to the topologically nearest node in a group of potential receivers, though it may be sent to several nodes, all identified by the same destination address. Anycast addressing routes datagrams to a single member of the group of potential receivers that are all identified by the same destination address such that there is a one-to-one-of-many association.

Traditionally, data centers using classical Ethernet switches have implemented HSRP to achieve fault tolerance. As discussed, HSRP typically operates in a two-node Active/Standby pair in which the node operating in the active state forwards the Layer 3 (L3) traffic upstream, and the peer node operating in standby purely provides redundancy. HSRP on VPC allows HSRP forwarding to be active on both nodes to fully utilize the dual connectivity to access. VPC+ extends this functionality to a two-node FabricPath spine using an emulated switch ID. As the number of nodes in a FabricPath network grows, there is a desire to utilize all the links connecting L3 spines and make use of full bisectional bandwidth of the FabricPath network. In Anycast HSRP, all the HSRP spine switches can forward L3 traffic thereby allowing both fault tolerance and high bandwidth utilization.

In accordance with particular embodiments, HSRP behavior is optimized by bundling HSRP groups together in an n-gateway configuration and using IS-IS to distribute the priority information of the HSRP Anycast bundle to the switches of the group bundle. In particular embodiments, HSRP protocol priority information is carried out-of-band through IS-IS packet type-length-value (TLV) data elements.

HSRP protocol traditionally uses HSRP Hellos to convey priority information, which is used to decide the role of the HSRP group (Active, Standby, Listen) and to communicate failure in the group bundle such through a successive loss of HSRP Hellos. In various embodiments, group bundling priority information for a redundancy protocol is disseminated through a link-state routing protocol, and the priority information is used to determine priority states for the group bundle. In particular embodiments, Anycast HSRP in which HSRP states are determined through priority information communicated through the IS-IS protocol TLVs. In a particular embodiment, the highest priority will be determined to be the Active, the next highest to be Standby, and the remaining priorities to be Listen. In various embodiments, the priority for a particular switch may be preconfigured by a network operator. In particular embodiments, the priority may fall within a range of 1-127. If there is a tie in priority, in various embodiments the MAC address is used to break the tie, with highest the MAC address winning. In one or more embodiments, the HSRP Hellos are still sent out to advertise the VMAC to enable MAC learning, however the HSRP group state is driven by the Anycast priority information conveyed through IS-IS.

For Anycast HSRP, an Anycast Switch ID (ASID) is defined that ties together a one or more VLANs. If an HSRP group is configured for a switch virtual interface (SVI) that is part of the VLAN range of the ASID, then the HSRP group also becomes part of that ASID. The configuration introduces a bundle to tie together these groups with the same ASID. The priority is configured at the Anycast bundle level. All the groups that are part of the bundle will hence undergo state transition together. This may also be required due to the Incoming Interface Check (IIC) in FabricPath networks. If the Active HSRP groups for the same ASID are split across multiple switches, then HSRP Hello messages are sent between the switch with the same ASID as the source, and the HSRP multicast Hello message will get dropped because of the IIC check. By defining a bundle, tying the HSRP groups together and defining bundle level HSRP state, various embodiments address the IIC check problem by limiting the Active HSRP groups to a single switch.

Various embodiments provide for facilitating bundling of HSRP groups, configuring a priority for the bundle and propagating this priority information through IS-IS in a FabricPath network. The HSRP group state is then controlled through the priority information received from IS-IS protocol packets and not through HSRP Hello packets. HSRP failure is also learned through IS-IS.

Still referring to FIG. 1, switches 104a-104d are configured as an Anycast gateway complex with each of switches 104a-104d having the same virtual MAC (VMAC) address such that the VMAC is shared by all of switches 104a-104d. Each of switches 104a-104d is further configured to have a gateway (GW) bit set to indicate that the particular switch 104a-104d is configured as a gateway router to Layer 3 network 108. Each of switches 104a-104d is further configured with the same anycast switch identifier (ASID) which functions to bundle switches 104a-104d together as an HSRP group. A redundancy priority may then be configured for each of switches 104a-104d of the bundled group. Each of the switches 104a-104d may then send priority information indicative of the particular switches priority to the other switches using a link-state routing protocol. In a particular embodiment, each switch 104a-104d sends the priority information associated with the particular switch to the other switches of the group using an IS-IS TLV. Each switch 104a-104d may then compute its state as either active, standby, or listen using its own priority and the priority information received from the other switches of the group bundle. In one or more embodiments, each switch 104a-104d may send its priority information to the other switches in the bundle using the link-state routing protocol on a periodic basis.

In a particular example, first switch 104a is configured with a redundancy priority of 100, second switch 104b is configured with a redundancy priority of 90, third switch 104c is configured with a redundancy priority of 70, and fourth switch 104d is configured with a redundancy priority of 50. First switch 104a sends priority information indicating its redundancy priority of 100 using the link-state routing protocol, such as using an IS-IS TLV, and the priority information is received by second switch 104b, third switch 104c, and fourth switch 104d. Similarly, second switch 104b sends priority information indicating its redundancy priority of 90 to first switch 104a, third switch 104c, and fourth switch 104d using the link-state routing protocol. Third switch 104c sends priority information indicating its redundancy priority of 70 to first switch 104a, second switch 104b, and fourth switch 104d using the link-state routing protocol. Fourth switch 104d sends priority indicating its redundancy priority of 50 to first switch 104a, second switch 104b, and third switch 104c using the link-state routing protocol. Upon receiving priority information from each of the switches 104a-104d, switches 104a-104d undergo an election procedure to determine the state of each of switches 104a-104d. In this particular example, first switch 104a is elected as the active switch as a result of having the highest priority among switches 104a-104d, and each of switches 104a-104d store the state of first switch 104a as in the active state. Second switch 104b is elected as the standby switch as a result of having the second highest priority among switches 104a-104d, and each of switches 104a-104d store the state of second switch 104b as in the standby state. Third switch 104c and fourth switch 104d are elected as being in a listen state as a result of their respective priorities being lower than the priorities of first switch 104a and second switch 104b.

In another example operation, first host device 106a sends an address resolution protocol (ARP) request to gateway group 112 using the VMAC address. First CE (C1) 102a receives the ARP request and forwards the ARP request to gateway group 112 using the ASID. As previously discussed, the same ASID is configured for each of switches 104a-104d and therefore the forwarded request may take any of paths L11, L12, L13, and L4. However, only the first switch 104a in the active state is configured to respond to the ARP request whereas switches 104b-104d will ignore the request.

In one or more embodiments, if the periodic link state messages containing priority information is not received from a particular one of switches 104a-104d within a predetermined time period, the particular switch may be assumed to have failed. Upon failure of a particular one of switches 104a-104d, the particular switch is removed from the group bundle and a new election procedure is performed to determine the new active state, standby state, and listen state switches. For example, if first switch 104a is determined to have failed, a new election procedure will result in second switch 104b being elective as the active switch due to second switch 104b having the highest priority of the remaining switches. Third switch 104c will be elected as the standby switch due to third switch 104c having the next highest priority, and fourth switch 104d will remain in the listen state.

An advantage provided in at least one embodiment is that out-of-band failure determination using priority information provided by a link-state routing protocol provides for faster re-convergence a system using HSRP Hello packet to carry such information. Another advantage of at least one embodiment is that HSRP Hellos messages can be sent out at much lower frequency by relaxing HSRP hello/hold timer periods due to the link-state routing protocol conveying the priority information rather than the Hello messages. Various embodiments may thus be suitable for employing in highly scaled configurations found in Massively Scaled Data Center (MSDC) environments.

Figure 2:
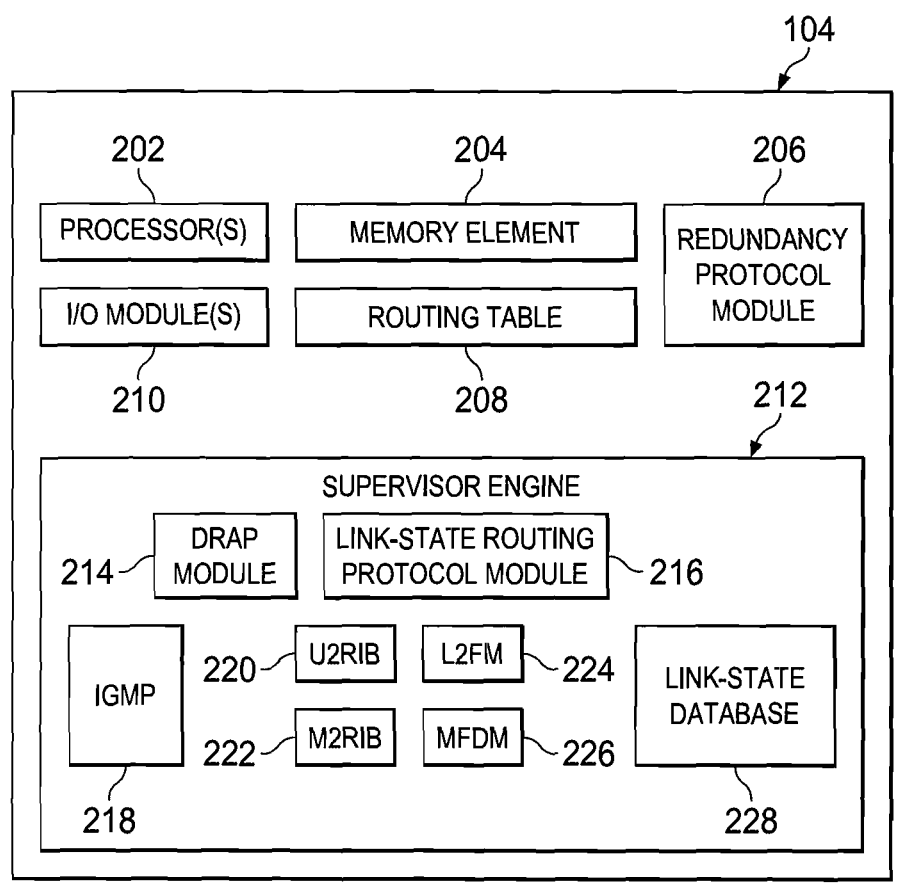
FIG. 2 illustrates an embodiment of a switch according to one embodiment.

Referring now to FIG. 2, FIG. 2 illustrates an embodiment of a switch 104 according to one embodiment. Switch 104 may include one or more of switches 104a-104d of FIG. 1. Switch 104 includes one or more processor(s) 202, a memory element 204, a redundancy protocol module 206, a routing table 208, I/O module(s) 210, and a supervisor engine 212. Processor(s) 302 is configured to execute various tasks of switch 104 as described herein and memory element 304 is configured to store data associated with switch. Redundancy protocol module 206 is configured to implement the various functions of the redundancy protocol as further described herein. In a particular embodiment, redundancy protocol module 208 is configured to implement a HSRP protocol. Routing table 208 is configured to store routing information associated with switch 104. I/O module(s) 210 are configured to interface switch 104 with one or more of network elements such as classical Ethernet switches 102a-102f, another switch 104a-104b, or with Level 3 network 108.

Supervisor engine 212 further includes a Dynamic Resource Allocation (DRAP) module 214, a link-state routing protocol module 216, an Internet Group Management Protocol (IGMP) module 218, a Unicast Layer 2 Forwarding module, a link-state routing protocol module 216, an Internet Group Management Protocol (IGMP) module 218, a Unicast Layer 2 Routing Information Base (U2RIB) module 220, a Multicast Layer 2 Routing Information Base (M2RIB) module 222, a Layer 2 Forwarding Manager (L2FM) module 224, a multicast forwarding distribution manager (MFDM) module 226, and a link-state database 228. DRAP module 214 is configured to ensure unique and consistent Anycast Switch IDs (ASIDs) within the Anycast FabricPath network. Link-state routing protocol module 216 implements the link-state routing protocol within the FabricPath network. In a particular embodiment, link-state routing protocol module 216 implements an Intermediate System-to-Intermediate System (IS-IS) protocol to implement Shortest Path First (SPF) routing. IGMP module 218 provides IGMP snooping support to switch 104 for building a multicast forwarding database for the edge switches of the FabricPath network. U2RIB module 220 contains the "best" unicast Layer 2 routing information. M2RIB module 222 contains the "best" multicast Layer 2 routing information. L2FM module 224 is configured to manage the MAC address table of switch 104. As discussed, FabricPath Layer 2 IS-IS is a dynamic link-state routing protocol that detects changes in the network topology and calculates loop-free paths to other nodes in the network. Link-state database 228 is contains information that describes the state of the network such that each switch 104 updates the status of the links that are adjacent to switch 104. In one or more embodiments, switch 104 sends advertisements and updates to the Link-state database 228 through all the existing adjacencies to switch 104.

In one implementation, switch 104 is a network element that includes software to achieve (or to foster) redundancy and link-state routing protocol operations, as outlined herein in this Specification. Note that in one example, each of these elements can have an internal structure (e.g., a processor, a memory element, etc.) to facilitate some of the operations described herein. In other embodiments, these operations may be executed externally to this elements, or included in some other network element to achieve this intended functionality. Alternatively, switch 104 may include this software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Figure 3:
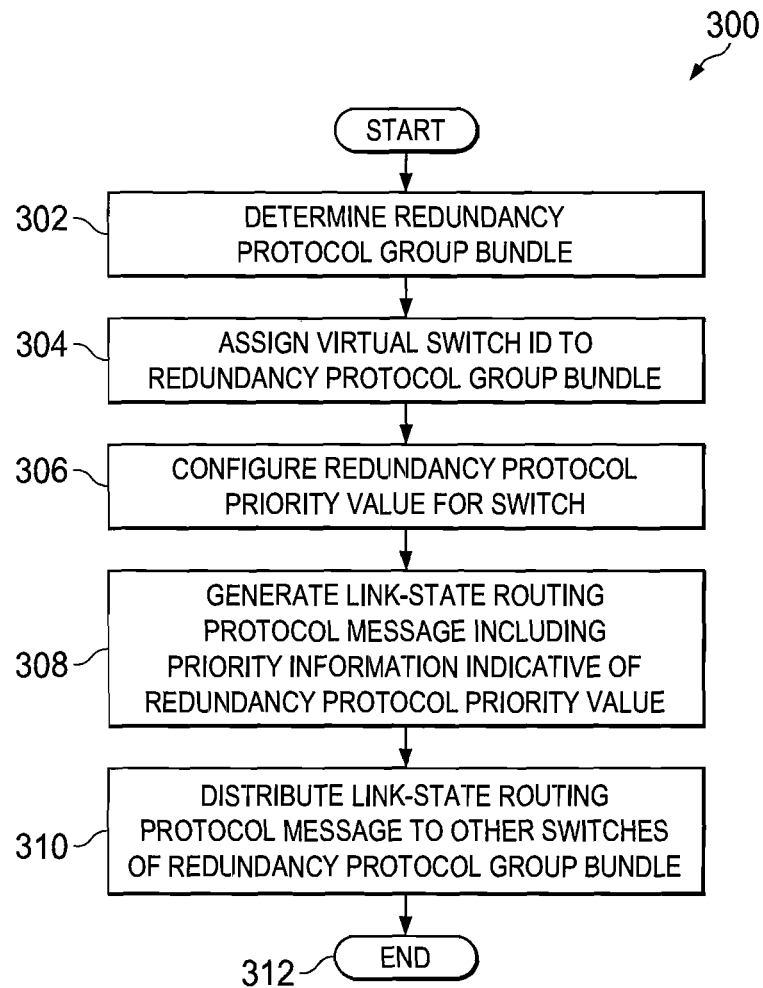
FIG. 3 is a simplified flowchart illustrating one embodiment of a procedure for disseminating group bundling priority information through a link-state routing protocol in a network environment.

Referring now to FIG. 3, FIG. 3 is a simplified flowchart illustrating one embodiment of a procedure 300 for disseminating group bundling priority information through a link-state routing protocol in a network environment. In 302, a redundancy protocol group bundle is determined by grouping together a number of switches into a redundancy protocol group. In some embodiments, the redundancy protocol group is an HSRP group. In a particular embodiment, the bundled group includes one or more of switches 104a-104d. In one or more embodiments, the link-state routing protocol enabled switching node is one or more of the switches 104a-104d of FIG. 1. In various embodiments, the determination of the members of the redundancy protocol group bundle may be determined by a network operator, supervisor, or other user. In still other embodiments, the members of the redundancy protocol group may be determined automatically. In 304, a virtual switch identifier (ID) is assigned to the redundancy protocol group bundle. In at least one embodiment, the virtual switch ID is an Anycast switch ID (ASID).

In 306, a redundancy protocol priority value for a particular switch of the redundancy protocol group bundle is configured. In a particular example, a redundancy protocol priority value of 100 is configured for first switch 104a. In 308, the particular switch generates a link-state routing protocol message including priority information indicative of the redundancy protocol priority value for the switch. In one or more embodiments, the link-state routing protocol message the priority information includes a switch identifier associated with the particular switch and the priority value associated with the particular switch. In one or more embodiments, the link-state routing protocol message is an IS-IS message. In a particular embodiment, the IS-IS message includes an IS-IS TLV data element.

In 310, the particular switch distributes the link-state routing protocol message to the other switches of the redundancy protocol group bundle according to the link-state routing protocol. In a particular example, first switch 104a distributes the links state routing protocol message including the priority information associated with first switch 104a to each of second switch 104b, third switch 104c, and fourth switch 104d according to the link-state routing protocol. In accordance with various embodiments, operations 306-310 may be repeated for each of the remaining switches of the redundancy protocol group bundle. In 312, the procedure 300 ends.

Figure 4:
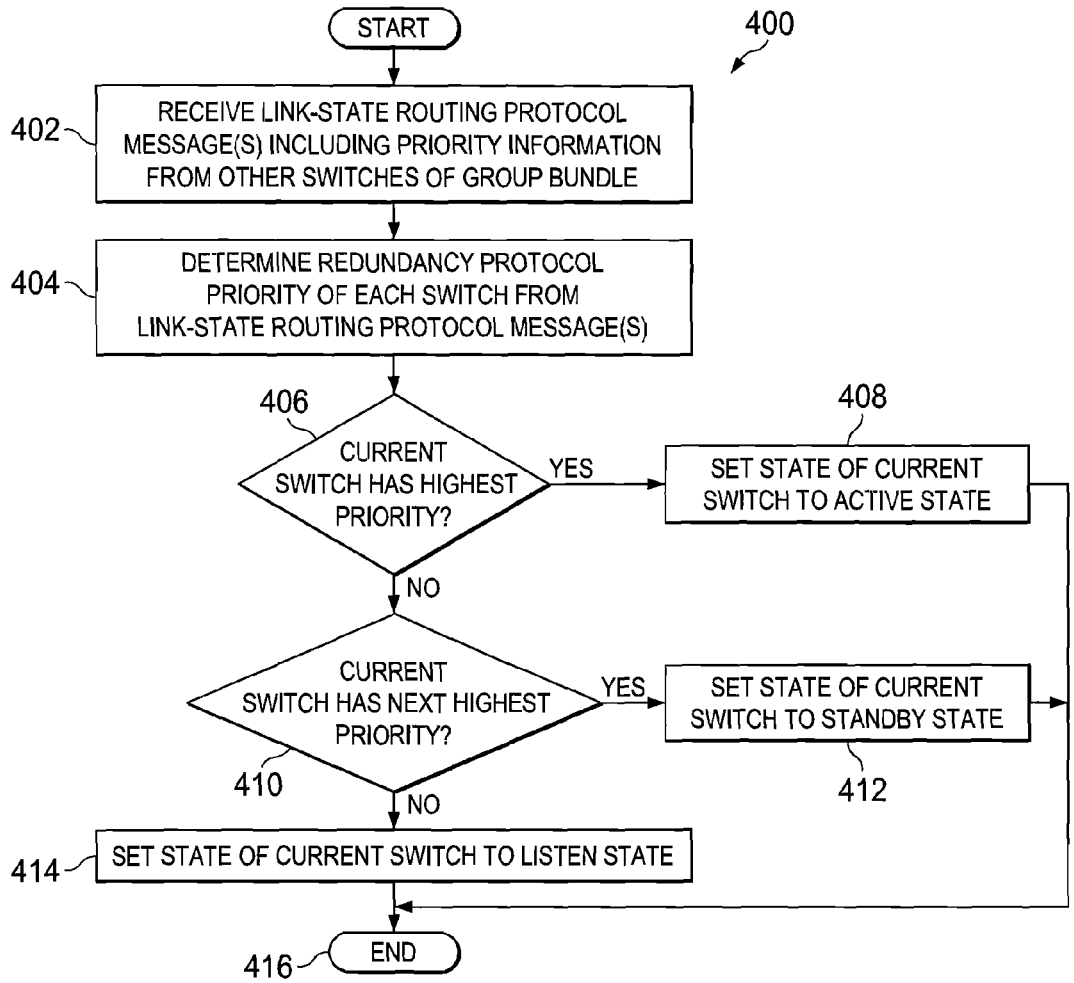
FIG. 4 is a simplified flowchart illustrating one embodiment of a procedure for determining a redundancy protocol state of a switch in a network environment.

Referring now to FIG. 4, FIG. 4 is a simplified flowchart illustrating one embodiment of a procedure 400 for determining a redundancy protocol state of a switch in a network environment. In the embodiment of FIG. 4, a current switch, such as first switch 104a, is configured as a switch a redundancy protocol group bundle and has a particular redundancy protocol configured therewith. In 402, a current switch of a redundancy protocol group bundle receives one or more link-state routing protocol messages including priority information associated with other switches of the redundancy protocol group bundle. In one or more embodiments, the priority information includes a redundancy protocol priority associated with the other switch and a switch identifier associated with the other switch. In a particular example operation, first switch 104*a* receives a first link-state routing protocol message from second switch 104*b* include the redundancy priority of second switch 104*b*, a second link-state routing protocol message from third switch 104*c* including the redundancy priority of third switch 104*c*, and a third link-state routing protocol message including the redundancy protocol of fourth switch 104*d*.

In 404, the current switch determines the redundancy protocol priority of each of the other switches from the received link-state routing protocol messages. In 405, the current switch determines whether it has the highest redundancy priority among the redundancy priorities of the switches of the group. If the current switch has the highest redundancy priority, the redundancy protocol state of the current switch is set to an active state and the operations end at 416. If the current switch does not have the highest redundancy priority of the switches of the group, the current switch determines whether it has the next highest redundancy priority of the group of switches at 410. If the current switch does have the next highest redundancy priority of the group of switches, the redundancy protocol state of the current switch is set to a standby state and the operations end at 416.

If the current switch does not have the next highest redundancy priority, the redundancy protocol state of the current switch is set to a listen state. The operations then end at 416.

In accordance with various embodiments, the operations of FIG. 4 are performed on a periodic basis by each of the switches of the currently operating switches of the redundancy protocol group bundle. In one or more embodiments, if a particular switch of the group bundle does not send a link-state routing protocol message within a predetermined time period, the particular switch is assumed to have failed, and the redundancy protocol state of each of the remaining switches are determined without the failed switch. For example, if first switch 104*a* does not send a link-state protocol message within a predetermined time period, second switch 104*b* is set to the active state, third switch 104*c* is set to the standby state, and fourth switch 104*d* is set to the listen state.

Figure 5:
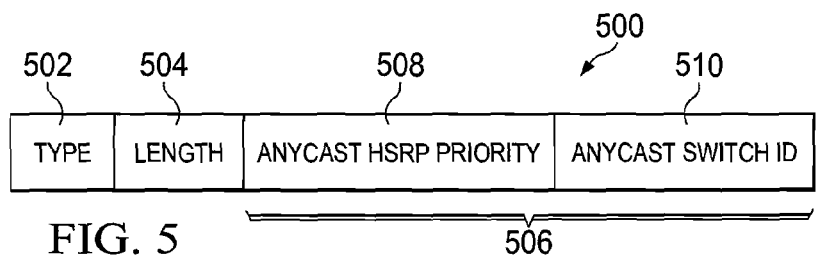
FIG. 5 illustrates an embodiment of an IS-IS TLV (type-length-value) data element for conveying redundancy priority information at a bundle level.

FIG. 5 illustrates an embodiment of an IS-IS TLV (type-length-value) data element 500 for conveying redundancy priority information at a bundle level. The IS-IS TLV data element includes a type field 502, a length field 504, and a value field 506 including an Anycast HSRP Priority field 508, and an Anycast Switch ID (ASID) field 510. Type field 502 indicates the type of items in value field 506. Length field 504 indicates the length of value field 506. Anycast HSRP Priority field 508 includes the redundancy priority value of the bundle. Anycast Switch ID 510 includes the Anycast Switch ID (ASID) associated with the bundle.

Figure 6A:
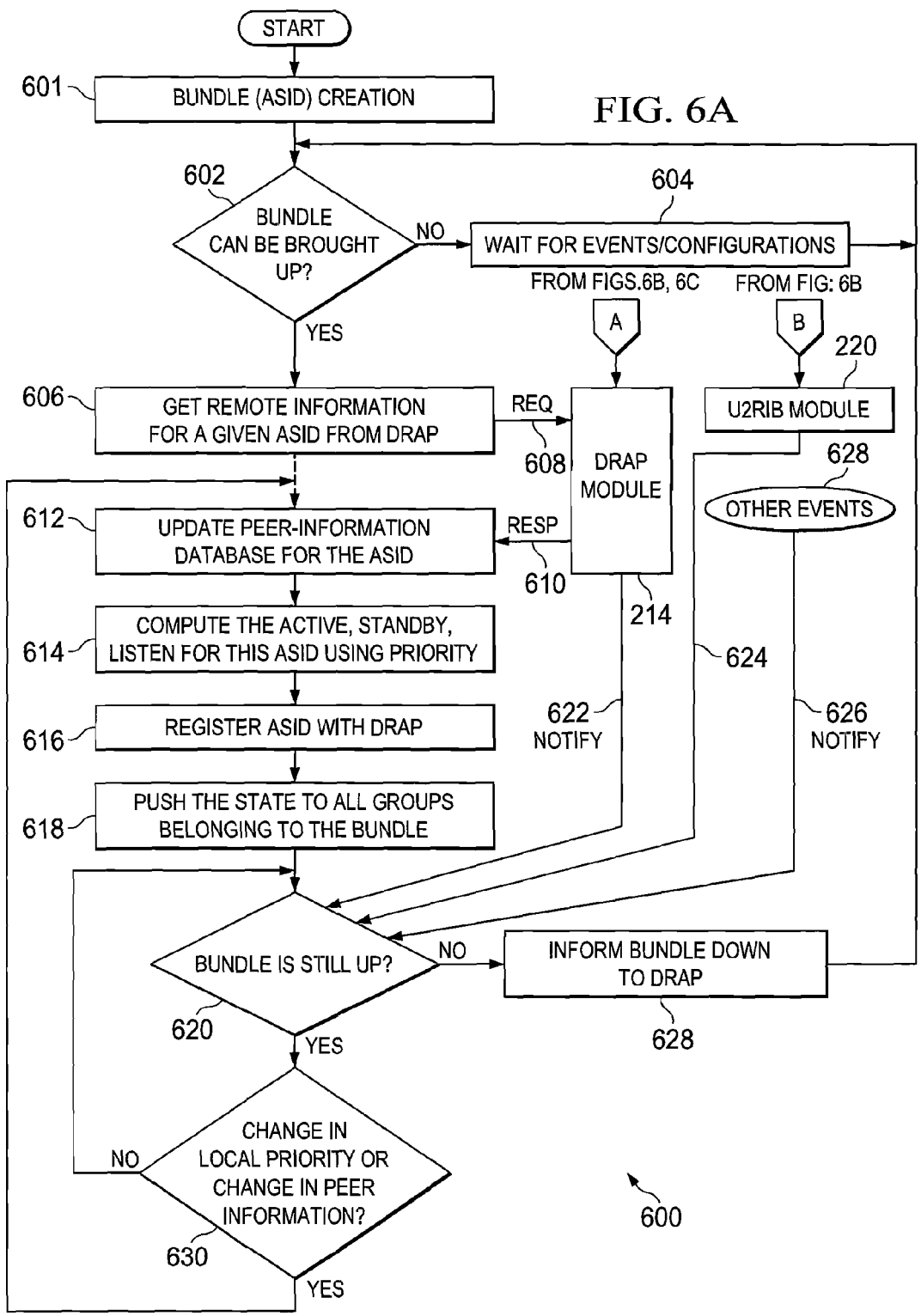
Figure 6B:
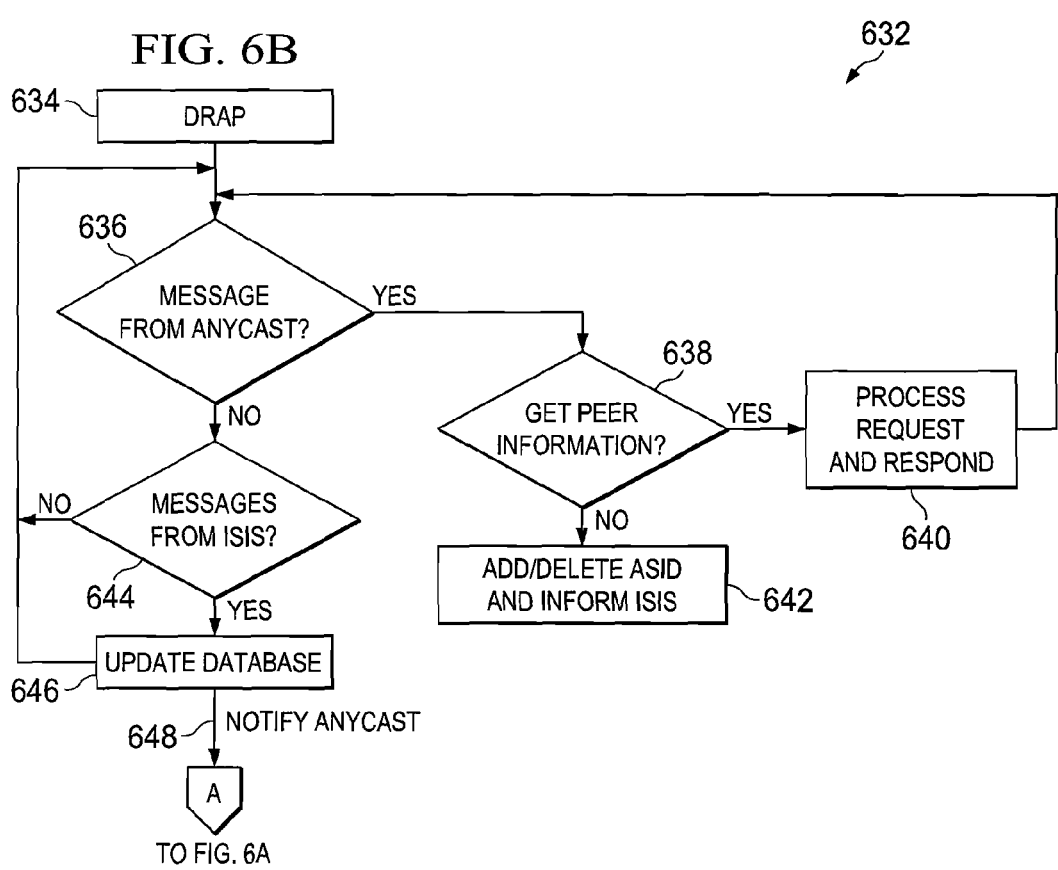

FIGS. 6A-6C are simplified flowcharts illustrating example operations of switch 104 of FIG. 2 according to one embodiment. FIG. 6A is a simplified flowchart 600 illustrating configuration and maintenance of redundancy parameters for bundled switches. In 602, bundle creation is initiated in which an Anycast switch ID (ASID) will be assigned to a bundle including one or more groups of switches. In 604, switch 104 determines whether the bundle can be brought up. If the bundle cannot be brought up, the operations continue to 604 in which switch 104*a* waits for one or more events or configurations associated with bundle creation to be received upon which the operations continue to 602. The one or more events or configuration may include designation of one or more switches or groups of switches as a bundle and the assignment of redundancy priority. If the bundle can be brought up, the operations continue to 606. In 606, switch 104 retrieves remote information for the given ASID from DRAP module 214 by sending a request 608 to DRAP module 214 and receiving a response 610 from DRAP module 214. The remote information may include redundancy priority information associated with one or more switches. In 612, switch 104 updates a peer-information database for the ASID.

In 614, switch 104 computes active, standby, and listen states for the ASID using the redundancy priority information. In 616, switch 104 registers the ASID with DRAP module 214. In 618, switch 104 pushes the computed state to all groups belonging to the bundle. In 620, switch 104 determines whether the bundle is still up. In accordance with various embodiments, switch 104 may determine whether the bundle is still up in response to a notification message 622 from DRAP module 214, a notification message 624 from U2RIB module 220, and/or a notification message 626 in response to one or more other events 628 indicative of the bundle being down.

If switch 104 determines that the bundle is not still up, switch 104 informs DRAP module 214 that the bundle is down in 628 and returns to 602. If switch 104 determines that the bundle is still up, in 630, switch 104 determines whether there is a change in local redundancy priority or a change in peer information that requires an update in the peer-information database. If there is not a change in local redundancy priority or a change in peer information that requires an update in the peer-information database, the operations return to 620. If there is a change in local redundancy priority or a change in the peer-information that requires an update in the peer-information database, the operations return to 612 in which the peer-information database is updated for the ASID.

FIG. 6B is a simplified flowchart 632 illustrating operations of DRAP module 214. In 634, a DRAP procedure is initiated by DRAP module 214. In 636, DRAP module 214 determines whether an Anycast message has been received. If an Anycast message has been received, in 638 DRAP module 214 determines whether the Anycast message is a request to retrieve peer information. If the Anycast message is a request to retrieve peer information, in 640 DRAP module 214 processes the request and sends a response to the request including the requested peer information. After 640, the operations then return to 636. However, if the Anycast message is not a request for peer information but is instead any Anycast message that is either an addition or deletion of a particular ASID, in 642 DRAP module 214 either adds or deletes the ASID and informs link-state routing protocol module 216, such as an IS-IS module, of the addition or deletion in accordance with the Anycast message.

If in 636 it is determined that an Anycast message has not been received, the operations continue to 644. In 644, DRAP module 214 determines whether an IS-IS message has been received. If an IS-IS message has not been received the operations return to 636. If an IS-IS message has been received, the operations continue to 646 in which the peer database is updated. In 648, an Anycast notification message is sent by DRAP module 214 indicating that the peer database has been updated.

FIG. 6C is a simplified flowchart 650 illustrating operations of the IS-IS module. In 652 an IS-IS procedure is initiated by the IS-IS module. In 654, the IS-IS module determines whether an addition or deletion of an ASID has been received from DRAP module 214. If the IS-IS module determines that an addition or deletion of an ASID has been received, the IS-IS module updates and advertises the ASID via an IS-IS protocol and operations continue to 658. If the IS-IS module determines than an addition or deletion of an ASID has not been received, the operations continue to 658. In 658, the IS-IS module determines whether the peer is alive. If the peer is not alive, the IS-IS module notifies U2RIB module 220 that the peer is not alive and U2RIB module 220 sends a more-to-send MTS notification.

If the IS-IS module determines in 658 that the peer is alive, the operations continue to 662 in which the IS-IS module determines whether there are any changes in redundancy priority. If there are no changes in redundancy priority, the operations return to 654. If there are changes in redundancy priority, the IS-IS module updates the priority change and notifies DRAP module 214 of the priority change in 664.

Note that in certain example implementations, the group bundling priority dissemination through a link-state routing protocol functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 2] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, switches 104a-104d may include software in order to achieve the functions outlined herein. Switches 104a-104d can include memory elements for storing information to be used in achieving the activities, as discussed herein. Additionally, switches 104a-104d may include a processor that can execute software or an algorithm to perform the n-way link-state routing redundancy operations, as disclosed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, tables, trees, cache, etc.) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the example provided above, as well as numerous other examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the steps in the preceding flow diagrams illustrate only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols, communication system 100 may be applicable to other protocols and arrangements. Moreover, communication system 100 can be extended to any link-state routing architecture.

Although communication system 100 has been illustrated with reference to particular elements and operations that facilitate the communication process, these elements and operations may be replaced by any suitable architecture or process that achieves the intended functionality of communication system 100.

What is claimed is:
1. A method, comprising:
   assigning a virtual switch identifier to a group of a plurality of switches, each of the plurality of switches configured with a redundancy protocol;
   configuring a redundancy protocol priority value for each the plurality of switches;
   generating at least one link-state routing protocol message including priority information indicative of the redundancy protocol priority value associated with one or more of the plurality of switches, wherein the priority information indicative of the redundancy protocol priority value is included within an out-of-band Intermediate System-To-Intermediate System (IS-IS) type-length-value (TLV) data element of the link-state routing protocol message, wherein the IS-IS TLV data element further includes a switch identifier associated with the redundancy protocol priority value;

distributing the at least one link-state routing protocol message to one or more of the plurality of switches;

receiving, at a first switch of the plurality of switches having a first redundancy priority value associated therewith, at least one of the link-state routing protocol messages including priority information indicative of at least one other redundancy priority value associated with at least one other switch of the plurality of switches;

determining the at least one other redundancy protocol priority value associated with the at least one other switch from the received at least one link-state routing protocol message; and determining a redundancy state of the first switch as one of an active state, standby state, and listen state based upon the first redundancy priority value associated with the first switch and at least one other redundancy protocol priority value associated with the at least one other switch, wherein the first switch is determined to be in the listen state if the first redundancy protocol priority value is less than the highest priority value and the next highest priority value among the at least one other redundancy protocol priority values.

2. The method of claim 1, further comprising determining that the redundancy state of the first switch is the active state if the first redundancy protocol priority value is greater than each of the at least one other redundancy protocol priority values.

3. The method of claim 1, further comprising determining that the redundancy state of the first switch is in the standby state if the first redundancy protocol priority value is the next highest priority value among the at least one other redundancy protocol priority values.

4. The method of claim 1, wherein the virtual switch identifier is an Anycast Switch identifier (ASID).

5. The method of claim 1, wherein the redundancy protocol is a Hot Standby Router Protocol (HSRP).

6. The method of claim 1, wherein the link-state routing protocol is an Intermediate System-To-Intermediate System (IS-IS) protocol.

7. One or more non-transitory tangible computer readable media that includes code for execution and when executed by a processor operable to perform operations comprising:

assigning a virtual switch identifier to a group of a plurality of switches, each of the plurality of switches configured with a redundancy protocol;

configuring a redundancy protocol priority value for each the plurality of switches;

generating at least one link-state routing protocol message including priority information indicative of the redundancy protocol priority value associated with one or more of the plurality of switches, wherein the priority information indicative of the redundancy protocol priority value is included within an out-of-band Intermediate System-To-Intermediate System (IS-IS) type-length-value (TLV) data element of the link-state routing protocol message, wherein the IS-IS TLV data element further includes a switch identifier associated with the redundancy protocol priority value;

distributing the at least one link-state routing protocol message to one or more of the plurality of switches;

receiving, at a first switch of the plurality of switches having a first redundancy priority value associated therewith, at least one of the link-state routing protocol messages including priority information indicative of at least one other redundancy priority value associated with at least one other switch of the plurality of switches;

determining the at least one other redundancy protocol priority value associated with the at least one other switch from the received at least one link-state routing protocol message; and determining a redundancy state of the first switch as one of an active state, standby state, and listen state based upon the first redundancy priority value associated with the first switch and at least one other redundancy protocol priority value associated with the at least one other switch, wherein the first switch is determined to be in the listen state if the first redundancy protocol priority value is less than the highest priority value and the next highest priority value among the at least one other redundancy protocol priority values.

8. The media of claim 7, wherein the operations further include determining that the redundancy state of the first switch is the active state if the first redundancy protocol priority value is greater than each of the at least one other redundancy protocol priority values.

9. The media of claim 7, wherein the operations further include determining that the redundancy state of the first switch is in the standby state if the first redundancy protocol priority value is the next highest priority value among the at least one other redundancy protocol priority values.

10. The media of claim 7, wherein the virtual switch identifier is an Anycast Switch identifier (ASID).

11. The media of claim 7, wherein the redundancy protocol is an Hot Standby Router Protocol (HSRP).

12. The media of claim 7, wherein the link-state routing protocol is an Intermediate System-To-Intermediate System (IS-IS) protocol.

13. An apparatus, comprising:

a memory element configured to store data, a processor operable to execute instructions associated with the data, and a protocol module, the apparatus being configured to:

assign a virtual switch identifier to a group of a plurality of switches, each of the plurality of switches configured with a redundancy protocol;

configure a redundancy protocol priority value for each the plurality of switches;

generate at least one link-state routing protocol message including priority information indicative of the redundancy protocol priority value associated with one or more of the plurality of switches, wherein the priority information indicative of the redundancy protocol priority value is included within an out-of-band Intermediate System-To-Intermediate System (IS-IS) type-length-value (TLV) data element of the link-state routing protocol message, wherein the IS-IS TLV data element further includes a switch identifier associated with the redundancy protocol priority value;

distribute the at least one link-state routing protocol message to one or more of the plurality of switches;

receive, at a first switch of the plurality of switches having a first redundancy priority value associated therewith, at least one of the link-state routing protocol messages including priority information indicative of at least one other redundancy priority value associated with at least one other switch of the plurality of switches;

determine the at least one other redundancy protocol priority value associated with the at least one other switch from the received at least one link-state routing protocol message; and determine a redundancy state of the first switch as one of an active state, standby state, and listen state based upon the first redundancy priority value associated with the first switch and at least one other redundancy protocol priority value associated with the at least one other switch, wherein the first switch is determined to be in the listen state if the first redundancy protocol priority value is less than the highest priority value and the next highest priority value among the at least one other redundancy protocol priority values.

14. The apparatus of claim 13, wherein the apparatus is further configured to determine that the redundancy state of the first switch is the active state if the first redundancy protocol priority value is greater than each of the at least one other redundancy protocol priority values.

15. The apparatus of claim 13, wherein the apparatus is further configured to determine that the redundancy state of the first switch is in the standby state if the first redundancy protocol priority value is the next highest priority value among the at least one other redundancy protocol priority values.

* * * * *